Aug. 15, 1967   E. P. MEAUX   3,336,217
PARTICULATE SOLIDS WITHDRAWAL METHOD
Filed July 15, 1965
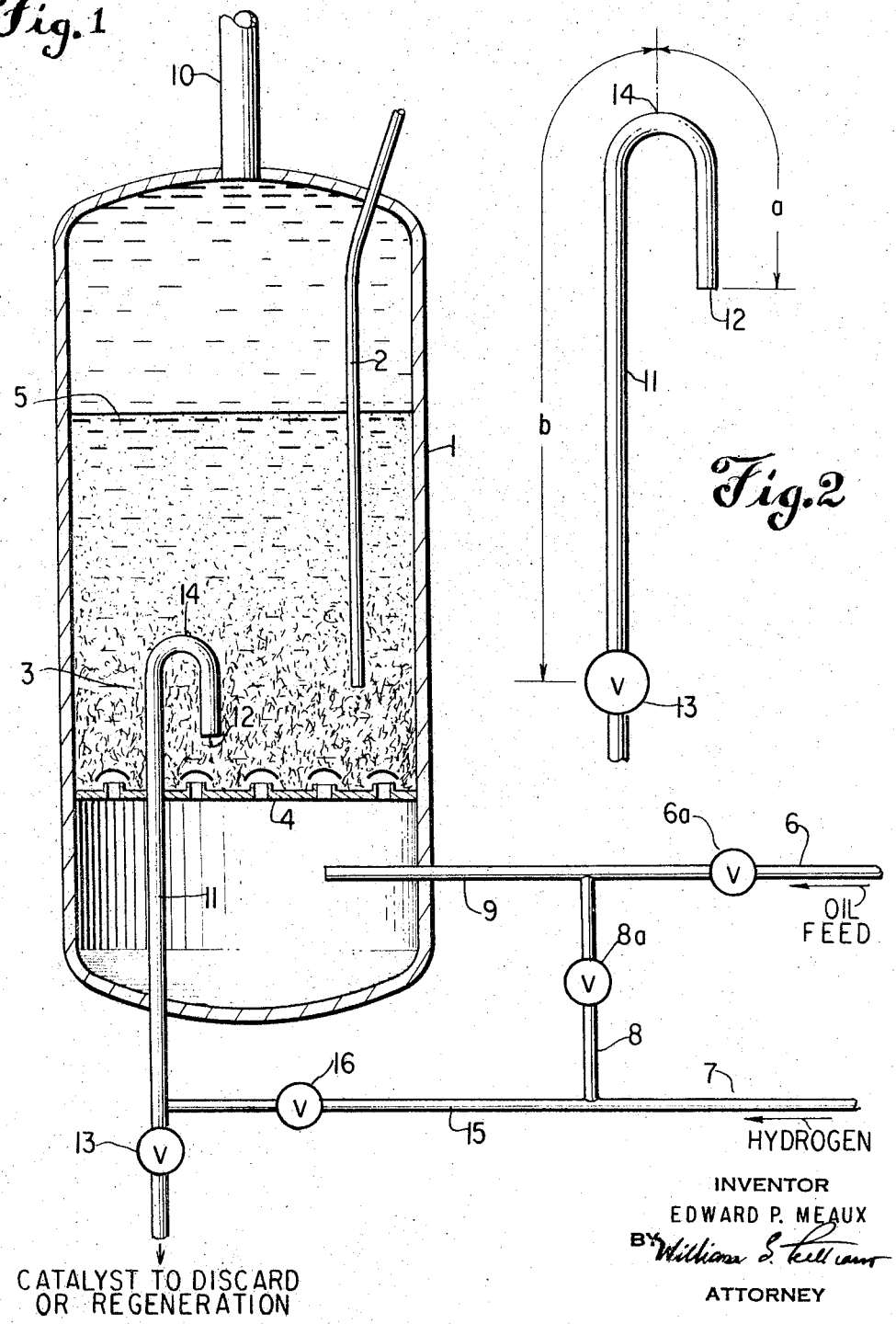
INVENTOR
EDWARD P. MEAUX
BY
ATTORNEY understanding of an ebullated bed-type hydrogenation process may be had by referring to U.S. Patent 2,987,465 to Johanson.

United States Patent Office 3,336,217
Patented Aug. 15, 1967

3,336,217
PARTICULATE SOLIDS WITHDRAWAL
METHOD
Edward P. Meaux, Lake Charles, La., assignor to Cities Service Research and Development Company, New York, N.Y., a corporation of Delaware
Filed July 15, 1965, Ser. No. 472,143
6 Claims. (Cl. 208—143)

ABSTRACT OF THE DISCLOSURE

A method and apparatus for intermittently withdrawing particulate catalyst from the bed of a high pressure and temperature reactor or similar vessel, wherein the apparatus is a withdrawal conduit or pipe having an opening into the reactor bed and extending upwardly to a bend having an angle from at least 90° to 270° (preferably 180°) and then extending downwardly to connecting conduits and valves outside the reactor, and having a volumetric ratio of the upwardly extending portion to the total volume of the withdrawal conduit of from 0.1 to 0.5. The method comprises: withdrawing the catalyst from the bed through the conduit; terminating the catalyst withdrawal; purging the withdrawal conduit of catalyst with a high velocity stream of a fluid such as generally inert gases or hydrogen; and maintaining the conduit clear with purging fluid at a relatively low velocity.

---

The present invention relates to an improved arrangement and method for withdrawing particulate solids from a vessel. More particularly, the invention relates to the improvements in the withdrawal of particulate solids maintained in a bed in contact with a liquid within a high pressure vessel.

The improvements provided by my present invention are broadly applicable to vessels in which various types of reaction, conversion or like operations employing particulate solids and liquids are carried out at super-atmospheric pressure. However, the invention is especially useful in the withdrawal of particulate solids, e.g. catalyst, from a liquid hydrocarbon treatment zone. For example, the invention has application in the removal of spent catalyst from a treatment zone in which a heavy hydrocarbon oil is contacted with gaseous hydrogen at high temperatures (e.g. 400° F. to 1500° F.) and high pressures (e.g. 1,000 to 5,000 p.s.i.g.) for the purpose of effecting hydrocracking, hydrodesulfurization, or like hydrogenation reactions. To effect hydrogenation reactions of this type, it has been found advantageous to pass the hydrocarbon oil and hydrogen upwardly through a bed of particulate catalyst under conditions such that the catalyst particles are maintained in random motion to become a so-called "ebullated bed."

Heretofore, it has been proposed to withdraw spent particulate catalyst from such hydrogenation zones by means of a discharge conduit extending substantially vertically downward from the catalyst bed through the bottom of the hydrogenation vessel. Removal of catalyst by this method has a number of serious drawbacks. For example, the vertically disposed catalyst withdrawal conduit has a tendency to plug-up with coke formed by in situ cracking of the hydrocarbon oil feed within the conduit, thereby preventing passage of catalyst therethrough. It has not been feasible to purge the conduit of coke with hydrogen. Such practice would require a large amount of cool hydrogen and would, therefore, be economically undesirable, as well as undesirable from the standpoint that an excessive concentration of hydrogen would be built-up at an unfavorable location within the hydrogenation zone.

My present invention provides an improved apparatus arrangement and method for withdrawing particule solids maintained in a bed in contact with a liquid within a high pressure vessel, i.e. a vessel maintained under super-atmospheric pressure. The arrangement and method of the invention are particularly applicable to the withdrawal of particulate solid, which may be catalytic in nature, maintained in a bed in contact with a liquid hydrocarbon in a hydrocarbon treatment zone within a high pressure vessel. As noted-above, withdrawal of spent catalyst from such hydrocarbon treatment operations, for example hydrogenation of heavy oils, has heretofore posed serious difficulties due to in situ coking of the hydrocarbon in the catalyst withdrawal conduit. The improved arrangement and method provided by the invention avoid these difficulties.

Various other objects and advantages of the invention will appear to those skilled in the art from the following detailed description thereof, taken in conjunction with the accompanying drawing, in which:

FIG. 1 is a sectional view, with parts in elevation, of a reactor for carrying out the hydrogenation treatment of hydrocarbon oils; and FIG. 2 is an elevation view, on an enlarged scale, of a conduit employed in the practice of the present invention to withdraw particulate solids from the reactor.

The reactor represented by reference numeral 1 is generally a vessel capable of withstanding pressures on the order of 1,000 to 5,000 p.s.i.g. and temperatures on the order of 400° F. to 1500° F. normally associated with hydrogenation operations. The reactor is supplied with particulate solids, which are preferably catalytic in nature, through conduit 2 extending downwardly into the reactor, to form a bed 3 supported on a conventional bubble cap tray 4 or other suitable means. The stationary volume of the catalyst bed 3, i.e. the volume of the bed when the hydrogenation process is not in operation, is generally from about ¼ to about 9/10 the volume of the bed during operation, the upper level of which is denoted by the reference numeral 5. A more complete understanding of an ebullated bed-type hydrogenation process may be had by referring to U.S. Patent 2,987,465 to Johanson.

As is well-known in the art, suitable hydrogenation catalyst include, for instance, cobalt, iron, molybdenum, nickel, tungsten, cobalt-molybdenum, etc. Such catalysts, as well as their sulfides and oxides, may be used alone or tother with other suitable catalysts such as naturally occurring clays, etc., or in combination with each other. The catalyst may also be supported on suitable bases such as alumina, silica or silica-alumina. Generally speaking, the diameters of the catalyst particles range from about ⅛ inch to about ½ inch and preferably are in the form of elongated extrudates.

Hydrocarbon oil feed entering through a conduit 6, provided with a valve 6a, and hydrogen entering through conduits 7 and 8, the latter conduit being provided with a valve 8a, are combined and passed through conduit 9 into the lower portion of the reactor 1. Prior to being charged to the reactor, the admixture may be passed through a preheater, not shown. The admixture of hydrogen and oil feed charged to the reactor passes upwardly through the bubble cap tray 4 and is thereby uniformly distributed throughout the catalyst bed 3 in the hydrogenation zone. The velocity at which the hydrogen and oil feed is passed upwardly through the catalyst bed is such that the catalyst particles are maintained in a state of ebullation, the gross mass thereof expanding to an upper level as denoted by 5.

The liquid and gaseous reactor effluent may be withdrawn together from the reactor by means of conduit 10 and passed to recovery or further treatment operations. If desired, the liquid and gaseous effluents may be withdrawn separately from the reactor by utilizing procedures known to the art.

In accordance with the invention, spent catalyst particles are intermittently withdrawn from the reactor and passed to a discard or a regeneration procedure by means of a conduit 11 which opens at one of its ends 12 into the lower and denser portion of the catalyst bed 3 within the hydrogenation zone, extends generally upwardly, then bends and extends generally downwardly through bubble cap tray 4 and the lower end of the reactor 1. The lower portion of the downwardly extending leg of conduit 11 is provided with a valve 13, which is, of course, closed when the catalyst is not being withdrawn from the reactor.

Referring now to FIGURE 2, the volume of section $a$ of conduit 11 extending from end 12 to the apex 14 of the bend is proportioned with respect to the entire volume of the conduit 11 to accommodate all of the liquid and solid material which would flow into the conduit upon a sudden reactor pressure surge. For the purpose of the present description, it is to be understood that the terminology, "entire volume of the conduit" refers to the volume of the conduit from end 12 to valve 13, i.e. total volume of sections $a$ and $b$. Thus, in accordance with the invention, the volume ratio of $a:a+b$ is at least about 0.1, and preferably is from about 0.2 to about 0.5.

The arc formed by the end of conduit 14 should be within the range of about 90° to about 270°, although it is preferably about 180°, as is depicted in the drawing.

As shown in FIGURE 1, a portion of the hydrogen supplied through conduit 7 may be passed through conduit 15 provided with a valve 16 or other suitable metering means into the lower portion of catalyst withdrawal conduit 11 at a point above valve 13. During periods when catalyst is not being withdrawn from the reactor, metering valve 16 is preferably partially opened thereby introducing a steady, relatively small flow of gas into conduit 11. The amount of hydrogen gas introduced should be sufficient to evacuate any solid and liquid material which may flow into section $a$ of conduit 11 upon a sudden pressure surge within the reactor, but should not be so great as to result in a non-uniform distribution of hydrogen within the hydrogenation zone of the reactor. For this purpose, it is generally desirable to introduce hydrogen into conduit 11 at a conduit velocity of from about 0.1 to about 2.0 feet/second. After the desired amount of catalyst has been removed from the reactor, the purge gas may be introduced into conduit 11 at a relatively high conduit velocity (e.g. from 3 to about 20 feet/sec.), such as by fully opening valve 16, to blow-back into the reactor any solids and liquids remaining in conduit 11.

It is, of course, expedient but not essential to employ hydrogen to clear and maintain conduit 11 substantially free of liquid and catalyst. Various fluid materials which are inert with respect to the desired hydrogenation reaction may also be used, including nitrogen, or low molecular weight saturated hydrocarbons, e.g. methane, ethane and propane, and the like.

Thus, in the practice of the invention particulate catalyst is removed from the reactor from conduit 11 by opening valve 13. When the desired amount of catalyst has been removed, valve 13 is closed and gas metering means 16 is adjusted to increase the flow of hydrogen into conduit 11, thereby causing any catalyst and liquid material entrained in the conduit to flow back through end 12 into the hydrogenation zone of the reactor. Once conduit 11 is cleared of entrained liquid and catalyst, the flow of hydrogen gas is decreased by appropriate adjustment of metering means 16 to provide a sufficient gas flow to maintain section $a$ of conduit 11 clear of any catalyst and liquid which may flow thereinto upon a sudden reactor pressure surge.

The invention will now be further described in reference to the following specific and non-limitative example:

Cobalt-molybdate catalyst in the form of $\frac{1}{32}''$ x $\frac{5}{16}''$ extrudates was intermittently withdrawn from an ebullated bed hydrogenation zone maintained at a pressure of about 2500 p.s.i.g. and a temperature of 810° F. using the apparatus arrangement described in reference to the drawing. The catalyst withdrawal conduit was a uniform 0.6" inside diameter pipe having an inlet positioned in the catalyst bed above the bubble cap tray 4. The conduit extended upwardly a distance of 6 inches from its inlet, bent 180° and extended downwardly a distance of 4 feet to a valve 13 outside the reactor. The conduit eventually led to a discharge pot, not shown in the drawing. Thus, the ratio of the volume of section $a$ of the conduit to the volume of sections $a$ plus $b$ was 1/9.

After the desired amount of catalyst had been withdrawn from the hydrogenation zone, hydrogen gas was fed into conduit 11 at a point one inch above valve 13 at a conduit velocity of 4 ft./sec. and under a pressure of about 2500 p.s.i.g., thereby blowing back into the hydrogenation zone entrained catalyst and liquid hydrocarbon oil. Thereafter, the flow of hydrogen to conduit 11 was reduced to 0.5 ft./sec. to maintain the conduit clear of catalyst and liquid hydrocarbon. No difficulties in catalyst withdrawal due to in-situ coke formation were experienced.

It will, of course, be appreciated that various changes and modifications may be made in the apparatus and arrangements thereof, which have been referred to herein to explain the nature of the invention, without departing from its spirit and scope as expressed in the appended claims. For instance, conduit 11 may be formed of sections of varying or non-uniform diameter. Furthermore, for the purpose of supplying a small flow of hydrogen to conduit 11 to maintain section $a$ of the conduit clear of catalyst and liquid, hydrogen supply conduit 15 may be provided with a restricted orifice in lieu of gas metering valve 16. When this arrangement is employed, a by-pass conduit may be valved around the restricted orifice in conduit 15 for the purpose of supplying the desired relatively large flow of hydrogen to conduit 11 following each catalyst withdrawal.

Likewise, it is to be understood that while the invention has been described with respect to an ebullated bed hydrogenation process, it is also applicable to a fixed catalyst bed process, as well as to hydrocarbon treatment operations wherein gaseous materials other than hydrogen are employed. Thus, the invention may be used with advantage to remove particulate solids from treatment zones in which hydrocarbon is subjected to nitration, oxidation, halogenation, sulfonation or like operations. In such operations, the fluid employed to purge the withdrawal conduit 11 may be the gaseous reactant.

Therefore, I claim:

1. Method for intermittently withdrawing particulate solid maintained in a bed in contact with a liquid within a high pressure vessel which comprises withdrawing said particulate solid through an enclosed passage extending generally upwardly from an inlet within said bed of particulate solid, bending and then extending generally downwardly to a point outside of said vessel, the ratio of the volume of the section of said enclosed passage from the inlet within said bed to the apex of the bend to the total volume of the passage being at least 0.1, terminating the flow of particulate solid through said passage, introducing a purge fluid into said passage at a relatively high velocity to cause any liquid and particulate solid entrained within said passage to flow back into said vessel, and thereafter introducing a purge fluid into said passage at a relatively low velocity to maintain said passage substantially free of liquid and particulate solid.

2. Method as in claim 1 wherein the ratio of the volume of the section of said passage extending from said inlet end to the apex of the bend to the total volume of the conduit is from about 0.2 to about 0.5.

3. Method as in claim 1 wherein the arc formed by the bending of said passage is greater than about 90° but less than about 270°.

4. Method as in claim 3 wherein the arc formed by the bending of said passage is about 180°.

5. Method as in claim 1 wherein said relatively high velocity of purge fluid is from about 3 feet/second to about 20 feet/second and said relatively low velocity of purge fluid is from about 0.1 to about 2.0 feet/sec.

6. Method as in claim 1 wherein said particulate solid is hydrogenation catalyst and is maintained in a bed in contact with heavy hydrocarbon oil in a hydrogenation zone maintained at a pressure of from about 1,000 to about 5,000 p.s.i.g. and at a temperature of from about 400° to about 1500° F., and said purge fluid is gaseous hydrogen.

References Cited
UNITED STATES PATENTS

| | | | |
|---|---|---|---|
| 2,707,163 | 4/1955 | Thibaut | 208—143 |
| 3,124,518 | 3/1964 | Guzman et al. | 208—143 |
| 3,136,712 | 6/1964 | Van Driesen | 208—143 |
| 3,227,528 | 1/1966 | Jaeger | 208—143 |

DELBERT E. GANTZ, *Primary Examiner.*

S. P. JONES, *Assistant Examiner.*